UNITED STATES PATENT OFFICE.

RALPH W. E. MacIVOR, OF LONDON, ENGLAND, ASSIGNOR TO METALS EXTRACTION CORPORATION LIMITED, OF LONDON, ENGLAND, A CORPORATION.

TREATMENT OF ORES CONTAINING NICKEL.

No. 859,776.  Specification of Letters Patent.  Patented July 9, 1907.

Application filed February 2, 1906. Serial No. 299,179.

*To all whom it may concern:*

Be it known that I, RALPH WALDO EMERSON MAC-IVOR, a subject of the King of Great Britain, residing at London, England, have invented certain new and useful Improvements in the Treatment of Ores Containing Nickel; and I do hereby declare the following to be a full, clear, and exact description of the invention, such as will enable others skilled in the art to which it appertains to make and use the same.

This invention relates to improvements in the treatment of ores containing nickel whereby the latter metal is first concentrated into a matte or regulus which is afterwards subjected to a process of slow roasting to convert the metallic sulfids composing the matte into the corresponding sulfates.

Oxidation having been effected by usual means, the temperature of the reverberatory furnace in which the operation is being carried on is gradually raised to and maintained at the point of complete decomposition of the sulfate of iron present in the roasted mass, the sulfate of nickel (cobalt if present) and copper (if present) being left unaltered. These latter salts are obtained in solution by throwing the hot mass from the furnace into water acidulated with sulfuric acid to an extent dependent upon the copper in the ore under treatment. This solution is allowed to settle, drawn off from the oxid of iron and other sedimentary matter and treated by known methods for the recovery of its copper contents. After the extraction of the copper the nickel and cobalt are precipitated from the solution by milk of magnesia or lime, or by soda, in the form of oxids, and these are collected and dealt with by known methods.

The method of forming the matte or regulus from the ore varies with the character and composition of the latter, but the agent employed is in every case sodium sulfid containing an excess of sulfur over the proportion contained in the normal sulfid $Na_2S$. In the case of sulfid arsenical ores a previous "dead" roasting is essential in order to get rid of the arsenic, whereas with ores of the double silicate of nickel and magnesia type (garnerite) no preliminary roasting is necessary before mixing with the sodium sulfid.

To carry out the operation of forming the matte the roasted or unroasted ore as the case may be is thoroughly mixed with from one fourth to one half its weight of the sulfid of sodium above described and not more than five per cent of carbon— preferably ground anthracite coal. This mixture is made into block or bricks with water and these after being dried sufficiently to allow of handling, are smelted either in a reverberatory furnace or in a water jacketed cupola of low height to minimize the reduction of iron.

Having now described my invention, what I desire to secure by Letters Patent is:—

1. The process of treating ores containing nickel, copper, cobalt and iron, which consists in forming a matte or regulus from the ore by mixing the ore with sulfid of sodium containing an excess of sulfur and a small quantity of carbon, heating the mixture under oxidizing conditions to change the metallic sulfids into sulfates, further heating the mass to decompose the sulfate of iron, immersing the hot mass in acidulated water to extract the copper, nickel and cobalt, and treating the product with an alkaline hydrate in solution to precipitate the nickel and cobalt, substantially as described.

2. In the process of treating ores containing nickel, the step of forming a matte or regulus, which consists in mixing the suitably treated ore with sulfid of sodium containing an excess of sulfur and a small quantity of carbon, substantially as described.

In witness whereof I have hereunto set my hand in the presence of two witnesses.

RALPH W. E. MacIVOR.

Witnesses:
 FREDERIC PRINCE,
 H. D. JAMESON.